Figure 1:
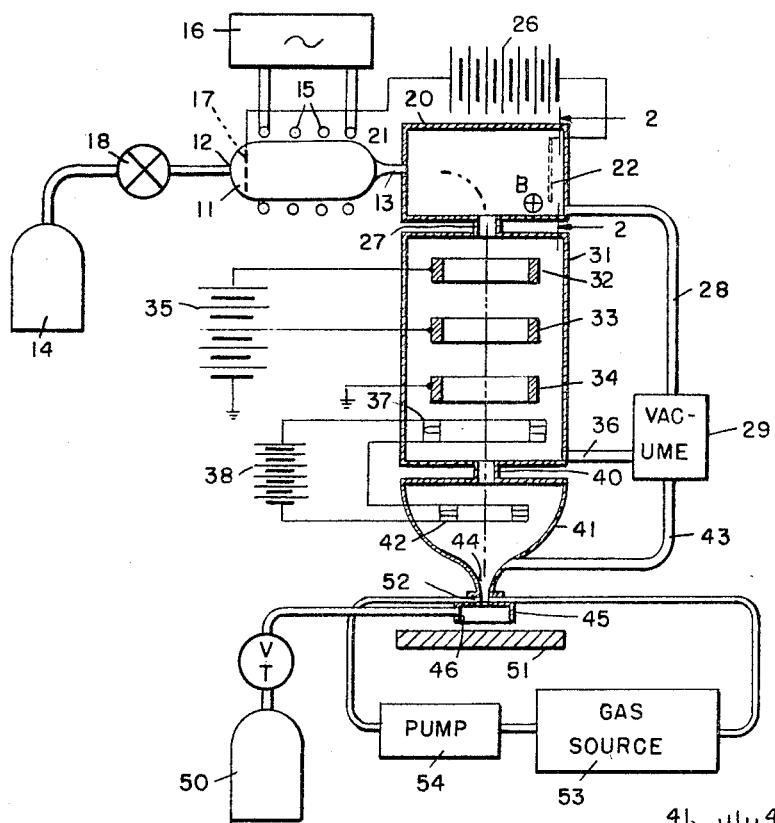

Sept. 6, 1966     W. J. HARRIS     3,271,556
ATMOSPHERIC CHARGED PARTICLE BEAM WELDING
Filed Oct. 31, 1963

INVENTOR.
WILLIAM J. HARRIS
BY
Agent

United States Patent Office 3,271,556
Patented Sept. 6, 1966

3,271,556
ATMOSPHERIC CHARGED PARTICLE
BEAM WELDING
William J. Harris, Sunnyvale, Calif., assignor to Lockheed Aircraft Corporation, Burbank, Calif.
Filed Oct. 31, 1963, Ser. No. 320,399
8 Claims. (Cl. 219—121)

The present invention relates generally to a new and improved positive charged particle discharge apparatus and in particular to a device for producing high energy proton beams for use in atmospheric welding.

There are many electron beam welders in general industrial use today. These devices may be separated into two general classes. The first class includes those electron beam welders in which the work piece to be welded is housed in a partial vacuum. There is considerable expense and difficulty in enclosing and maintaining the work piece in a high vacuum, especially when the work piece is anything other than a very small item. In the second class of electron beam welders, a continuous flow of inert gas surrounds the weld metal. This technique has proved to be a step forward in the art, especially in welding of large pieces of metal where vacuum housing is not practical. However, neither of these welders have proven to be a very satisfactory method of welding.

The prime reason electron beams for welding were generated in a vacuum or in an envelope of inert gas was to prevent electron scattering. When high speed electrons move in the atmosphere, or for that matter in any medium, they are scattered in collisions with nuclei and other electrons. The distance traveled between an impact is referred to as "mean free path" which is a function of medium density, temperature, and molecular size. A collision with a nucleus, inelastic scattering, does not involve a loss of kinetic energy but does deviate the electron path. Striking another electron not only alters direction, but considerable energy is dissipated due to ionization and excitation.

The importance of scattering becomes evident when we consider the principle variable of electron beam welding; that is, the principle of beam energy density. In order to fabricate a successful weld, electrons must impinge upon the weld metal over a very small area. Most joining is accomplished with spot diameters of 10 to 30 thousands of an inch. In order to achieve these diminutive spot sizes, the electron beam must be formed and focused, acquiring a travel distance of about 10 inches to the work piece surface. This would be impractical to attempt in the atmosphere where a collision can be predicted for every 10 thousandths of an inch, allowing only negligible energy to reach the work area.

The above-mentioned inert gas electron beam welding is done by accelerating electrons through a series of evacuating chambers. The pressure increases from about $10^{-3}$ mm. of hydrogen to one atmosphere in the exit chamber, which has an opening for the electron beam to pass. Helium is employed as a cover gas because of an inherently high mean free path. This approach has two major drawbacks. First, the demands on an evacuation system appear to be a technical as well as an economic hardship. Secondly, the accelerating voltages required to propagate the necessary energy densities at the work area are extremely high; that is, on the order of approximately 150 kilovolts. These potentials are not only impressive to overcome the energy lost due to scattering, but due to the small mass of an electron, the beam must be accelerated to velocities up to ½ the speed of light in order to acquire requisite energy levels.

In order to overcome the aforementioned difficulties with electron beam welding, a new approach to the problem has been developed. This new approach involves the utilization of high energy proton beams to replace the present electron beam. The greater mass of protons offers energy levels in excess of 1800 times those available for equal voltages with electron beams. In addition, the higher mass would tend to decrease the effect of inelastic scattering. Elevated energy levels would permit substantial losses to the medium while delivering adequate beam densities to the work piece.

It is, therefore, the object of the present invention to provide a charged particle welding device utilizing high energy proton beams to weld metals at atmospheric pressures.

This object and other objects and advantages of the invention will be more fully set forth in the following specification and claims and drawings.

Figure 2:
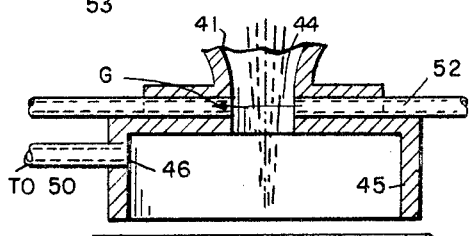
Figure 3:
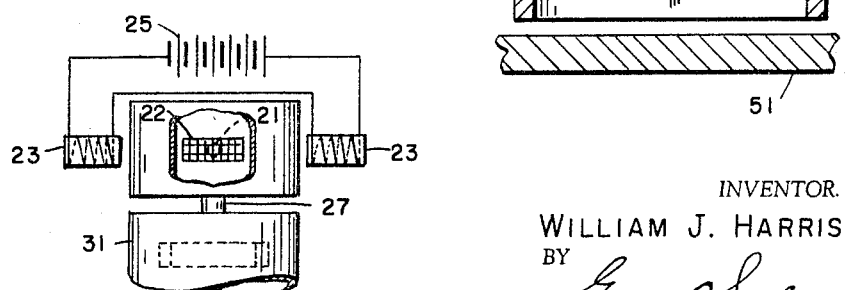

FIGURE 1 is a schematic longitudinal sectional view of the present invention,
FIGURE 2 is a fragmentary view of FIGURE 1 taken at line 2—2 in the direction of the arrows, and
FIGURE 3 is an enlarged fragmentary view of FIGURE 2 encompassed by the line 3—3.

Referring now to FIGURE 1 of the drawings, an apertured, substantially cylindrical chamber 11 of quartz, polished stainless steel, or similar material having high melting point and low diffusion properties, is provided as an ionizing or proton producing chamber. A continuous flow of inert gas is supplied to chamber 11 via input aperture 12 from a gas source 14. The flow rate of gas from gas supply 14 may be regulated as desired by valve 18. A metal coil 15 surrounds the outer wall of cylinder 11 and is excited by an RF or other high frequency generator 16 connected thereto. Generator 16 must generate a frequency high enough to produce ionization and high yield proton generation from the gas in accordance with known practice. Ionization coil 15 may be made of hollow tubing if so desired to provide a path for a liquid coolant (not shown) to provide cooling of coil 15 and ionization chamber 11. A positively charged grid member 17 is disposed within chamber 11 adjacent to aperture 12.

The output of ionizing chamber 11 is connected to an extraction chamber 20, a cylindrical chamber of, for example, polished stainless steel. An output aperture 13 of chamber 11 and an input aperture 21 of chamber 20 provide means for passing the positive charged particle beam from ionization chamber 11 into extraction chamber 20.

Extraction chamber 20 is provided with a negative charged grid member 22 positioned adjacent the cylinder wall opposite from input aperture 21. A D.C. power supply 26 is connected to grid 17 and grid 22 of extraction chamber 20 to provide the necessary voltages thereon. As seen in FIGURE 2, an electromagnet 23 is disposed on either side of extraction chamber 20 in a position substantially normal to the flow of incoming positive charged beam of protons and ions from chamber 11. A D.C. source 25 is connected to magnets 23 to provide a magnetic field B through extraction chamber 20.

An output aperture 27 is provided in one wall of extraction chamber 20 so the ion or proton beam which is bent downward by the force of the magnetic field B of magnet 23 can pass out of chamber 20. A high vacuum is maintained within extraction chamber 20 by a high vacuum system 29, connected to extraction chamber 20 by suitable means, for example, high vacuum line 28.

An elongated cylindrical body 31 made of, for example, polished stainless steel, provides an accelerating chamber for the incoming positive charged beam of ions and protons from extraction chamber 20. A plurality of acceleration electrodes 32, 33, and 34 accelerate the beam as it passes through acceleration chamber 31. The acceleration electrodes 32, 33, and 34 are interspaced such as to reduce the possibility of arcing or high voltage breakdown therebetween, yet achieve a suitable high voltage gradient to insure acceleration of the beam. A suitable D.C. power supply 35 furnishes the necessary potential for acceleration electrodes 32, 33, and 34. A high current coil 37 is positioned in the output end of acceleration chamber 31 to sharply focus the positive charged particle beam. High current coil 37 is energized by and connected to a high current source 38. The positive charged particle beam is passed out of acceleration chamber 31 via aperture 40 at the output portion thereof. A vacuum is provided by connecting chamber 31 with high vacuum source 29 via high vacuum line 36.

An emission chamber 41, having a second high current focusing coil 42 disposed therein, receives the beam from acceleration chamber 31 through aperture 40. Emission chamber 41 is tapered at its lower end portion and is provided with a narrow output aperture 44 to allow the particle beam to pass into the atmosphere and onto a work piece 51.

An apertured cup member 45 is suitably mounted on the outside of emission chamber 41 adjacent output aperture 44. A small opening 46 is provided in the side wall of base cup 45 to provide means for connecting a cover gas source 50 to cup member 45. As best seen in FIGURE 3, a channel 52 having a substantially square cross-section is provided between the closed end wall of cup 45 and the output aperture 44 of emission chamber 41, normal to the outcoming positive charged beam. A high velocity gas pump 54 connected between a gas source 53 and channel 52 projects gas from gas source 53 past output aperture 44 at a very high, for example, supersonic speeds, to aid in maintaining the high vacuum within emission chamber 41.

During operation of the charged particle beam welding device, incoming gas from gas supply 14 is ionized within chamber 11 by the RF excitation coil 15. The RF coil generates a plasma caused by ionization of the hydrogen, and produces ions, protons, and electrons; for example, the hydrogen is ionized as follows:

$$H_2 \rightarrow H_2^+ + e \rightarrow H^+ + H^+ + e$$

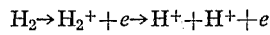

Other inert gas from gas supply 14 produces ions only. As used in this specification, the term "positive charged particles" includes protons and ions. Flow rates of the gas supply are controlled as desired; for example, between 50 and 1000 cubic feet per hour depending upon the desired particular proton or ion yield. Grid 17 is located out of the hot plasma area and serves as a positive anode to remove extraneous electrons from the incoming gas supply and accelerate positive protons and/or ions into extraction chamber 21. In extraction chamber 21, the beam of plasma is passed through magnetic field B which is directed substantially normal to both the direction of the plasma beam and the direction intended path of positive particles through acceleration chamber 31. The plasma beam passing through the magnetic field B is subjected to a cross-field effect, causing the positive particles therein to be deflected downward, and out of extraction chamber 21 through aperture 27. The flux density of magnetic field B can be varied as desired, for example, between 500 and 50,000 gauss.

The positive charged particles which were bent downward or extracted from the plasma flow by magnetic field B are formed into a beam, and accelerated through acceleration chamber 31 by the charge on electrodes 32, 33, and 34. For example, a 25 kv. voltage differential would be desirable between each of these electrodes. The positive charged particles are focused by the current focusing coil 37 at the output end of chamber 31 and by coil 42 in extraction chamber 41 into a very dense beam of positive charged particles. The focused, dense beam of positive charged particles passes through output aperture 44 into an atmospheric pressure region.

High vacuum system 29 should be capable of maintaining a pressure of about 1 micron within chamber 41 and pressures only slightly lower in acceleration chamber 31, extraction chamber 20 and ionizing chamber 11. In order to aid in maintaining the high vacuum within chamber 41, a gas flow of high velocity, preferably one of supersonic speed, passes past the output aperture 44 of chamber 41 via channel 52. This high velocity gas flow appears transparent to the beam of positive charged particles but acts as a gas shield for the vacuum chamber, thus reducing the in-flow of gas at atmospheric pressure into chamber 41.

The cover gas emanating from cover gas source 50 maintains an atmosphere for the beam with a high mean-free path to minimize scattering of the particle beam. The stream of protons and ions passes through the cover gas and strikes work piece 51. It is desirable that the distance that the beam must traverse from the output aperture 44 of emission chamber 41 to work piece 51 be kept at a minimum; for example, on the order of 15 millimeters. This small distance is desirable to minimize scatter losses.

It will be obvious with those skilled in the art that various changes and modifications may be made without departing from the scope of the invention as defined in the following claims.

What is claimed is:

1. In a device for projecting a beam of high-energy positive charged particles including protons;
   a plurality of interconnected partially evacuated chambers, said chambers including a first chamber having an input aperture for receiving an incoming flow of gas suitable for ionizing and means for ionizing said gas to produce a flow of plasma;
   said partially evacuated chambers further including charged electrode means disposed in the path of said plasma to attract negative charged particles of said plasma thereto and means for extracting the positive charged particles from said plasma, said means including a magnet disposed on the outside portion of a second chamber such that its magnetic field is directed normal to the flow of plasma through the input aperture of said second chamber, said partially evacuated chambers further including means for accelerating the positive charged particles, means for forming said positive charged particles into a highly focused beam and an aperture providing an exit for discharging said beam of high energy particles from said device, said magnet's magnetic field deflecting the positive charged particles out of the flow of plasma and deflected toward said means for accelerating said positive charged particles.

2. The device according to claim 1 wherein said plurality of interconnected partially evacuated chambers includes an elongated cylindrical chamber connected to said second chamber, said means for accelerating said beam of positive particles disposed within said elongated cylindrical chamber including a plurality of electrodes, means connected to said electrodes for applying a successive fraction of a source of a high voltage driving potential to accelerate said beam of positive charged particles.

3. The device according to claim 2 wherein a first central axis is defined in said first chamber by a line between the input aperture and the interconnecting aperture between said first and second chambers, said first central axis extending into said second chamber, a second central axis defined by the center line of the elongated cylindrical chamber, said second central axis extending into said second chamber and intersecting at substantially right angles to said first central axis within said second chamber.

4. The device according to claim 3 wherein said input gas flow and said plasma flow are directed along said first central axis and the positive charged particles deflected from the plasma beam are directed along said second central axis by said magnet's magnetic field.

5. The device according to claim 4 wherein said plurality of interconnected partially evacuated chambers includes an emission chamber connected to said acceleration chamber, means for forming said positive charged particles into a highly focused beam and said aperture providing an exit for said beam of high energy positive charged particles disposed within the emission chamber, said means for forming the positive charged particles into a highly focused beam including an annular coil disposed within said emission chamber, a high current source connected to said coil for focussing the positive charged particles into a narrow, dense beam of positive charged particles.

6. The device according to claim 4 wherein said cylindrical chamber further includes an annular coil, a high current source connected to said annular coil for focusing said positive charged particles.

7. The device according to claim 5 wherein said aperture providing an exit for said beam of positive charged particles is in output aperture connecting the inside region of the partially evacuated emission chamber and the outside region thereof, the outside region being at substantially atmospheric pressure, means disposed adjacent said output aperture for providing an air shield between the outside region of said emission chamber and the inside region thereof to maintain the vacuum within said partially evacuated chambers.

8. The device according to claim 7 wherein said means for providing an air shield includes an elongated channeled member having an input and output, a gas supply connected to the input and output ends thereof, pumping means interconnected between said gas supply and one end of said channeled member for projecting gas through said channeled member at a high velocity in a direction substantially normal to the output beam of positive charged particles.

References Cited by the Examiner

UNITED STATES PATENTS

| 2,836,750 | 5/1958 | Weimer | 313—63 |
|-----------|--------|--------|--------|
| 2,839,706 | 6/1958 | Anderson et al. | 313—63 X |
| 2,899,556 | 8/1959 | Schopper et al. | |
| 2,908,821 | 10/1959 | Schumacher. | |
| 3,015,745 | 1/1962 | Klein | 313—63 |
| 3,143,680 | 8/1964 | Klein et al. | |
| 3,156,811 | 11/1964 | Barry | 219—121 |
| 3,243,570 | 3/1966 | Boring | 219—121 |

JOSEPH V. TRUHE, *Primary Examiner.*

RICHARD M. WOOD, *Examiner.*